US005451361A

United States Patent [19]

Ruyter et al.

[11] Patent Number: 5,451,361

[45] Date of Patent: Sep. 19, 1995

[54] PROCESS FOR UPGRADING LOW-QUALITY WOOD

[75] Inventors: Herman P. Ruyter; Anton Hortulanus, both of Amsterdam, Netherlands

[73] Assignee: Shell Oil Company, Houston, Tex.

[21] Appl. No.: 230,576

[22] Filed: Apr. 21, 1994

[30] Foreign Application Priority Data

Apr. 21, 1993 [EP] European Pat. Off. ........... 93201161

[51] Int. Cl.[6] ........................ B29C 35/04; B29C 35/16; B29C 71/02

[52] U.S. Cl. .................................... 264/322; 144/380; 264/345; 264/347; 264/348

[58] Field of Search ............... 264/320, 322, 340, 345, 264/347, 348; 144/380

[56] References Cited

U.S. PATENT DOCUMENTS

| | | | |
|---|---|---|---|
| 2,016,568 | 10/1935 | Zinser | 264/322 X |
| 2,495,282 | 1/1950 | Pinkney . | |
| 2,642,371 | 6/1953 | Fahrni . | |
| 3,021,244 | 2/1962 | Meiler . | |
| 3,282,313 | 11/1966 | Schuerch . | |
| 4,007,312 | 2/1977 | Stofko et al. . | |
| 4,061,819 | 12/1977 | Barnes . | |
| 4,163,840 | 8/1979 | Geyer et al. . | |
| 4,255,477 | 3/1981 | Holman . | |
| 4,469,156 | 9/1984 | Norimoto et al. . | |
| 4,500,594 | 2/1985 | Credali et al. . | |
| 4,569,873 | 2/1986 | Robbins . | |
| 4,610,913 | 9/1986 | Barnes . | |
| 4,751,131 | 6/1988 | Barnes . | |
| 4,942,081 | 7/1990 | Reiniger . | |
| 5,017,319 | 5/1991 | Shen . | |
| 5,334,445 | 8/1994 | Ruyter et al. | 144/380 X |

FOREIGN PATENT DOCUMENTS

| | | |
|---|---|---|
| 0058541 | 8/1982 | European Pat. Off. . |
| 373725 | 6/1990 | European Pat. Off. . |
| 373726 | 6/1990 | European Pat. Off. . |
| 0460235 | 12/1991 | European Pat. Off. . |
| 3-97503 | 4/1991 | Japan . |
| 497477 | 12/1938 | United Kingdom . |

OTHER PUBLICATIONS

Markku Peraeniitty & Kauko Kotikangas of Imatran Voima Oy, Finland "Industrial Radio Frequency Drying of Wood", a Kema Conference Paper. (Sep. 1989).

R. Stirling, "Ohmic Heating–A new Process for the Food Industry", Power Engr. Journal, Nov. 1987, pp. 365–371.

C. H. Biss et al, "Process Engineering in the Food Industry", Ed. Elsevier, Amsterdam, 1989, pp. 17–27.

*Primary Examiner*—Leo B. Tentoni

[57] ABSTRACT

A process for upgrading low-quality wood including a softening stage, wherein one or more sections of low-quality wood are heated, in the presence of an aqueous medium and at a pressure which is at least the equilibrium pressure of the medium at the operating temperature, to a temperature in the range of from about 120° C. to about 160° C. and maintaining the temperature until the temperature difference between the center and the outer parts of the sections is less than about 20° C., a dewatering stage and a curing stage.

19 Claims, No Drawings

PROCESS FOR UPGRADING LOW-QUALITY WOOD

FIELD OF THE INVENTION

The present invention relates to a process for upgrading low-quality wood to high-quality wood in an environmentally sound way, and to high-quality wood obtained by means of this process.

BACKGROUND OF THE INVENTION

EP 037326 discloses that a cellulosic fibrous aggregate is formed from a cellulosic fibrous material by a process which comprises: a softening stage comprising exposing a section of cellulosic fibrous material to the action of an aqueous softening agent at a temperature in the range of from 150° C. to 220° C. at a pressure of at least the equilibrium vapor pressure of the softening agent at the operating temperature, thereby at least partially disproportionating and hydrolysing the hemicellulose and lignin present in the cellulosic fibrous material; and a curing stage comprising drying the product of the softening stage at a temperature in the range of from 100° C. to 220° C. to yield a cross-linked cellulosic matrix.

This process uses traditional ways of heating and drying the wood. These methods rely on thermal conduction to raise the temperature of the wood and evaporate water contained therein. The poor thermal conductivity of wood and the sensitivity of the process chemistry to extended heating times, result in limitations on product thickness and quality for such process. Furthermore, it has been found that gradients in temperature, pressure and moisture concentration induce stresses in wood, which may result in the formation of cracks and consequent loss of mechanical strength.

Hence it can be concluded that there is need for a process for upgrading low-quality wood which allows the processing of sizable sections of low-quality wood.

Surprisingly it has now been found that relatively large sections of low-quality wood can be upgraded in a process as described hereinbefore by using a specific heating profile wherein the sections of wood are first heated to an intermediate temperature followed by a waiting period to obtain a temperature balance between the center and the outside of said sections, whereafter the temperature of the heated sections is raised to the ultimately desired temperature.

SUMMARY OF THE INVENTION

The present invention relates to a process for upgrading low-quality wood to high-quality wood comprising: a) a softening stage, wherein one or more sections of low-quality wood are heated, in the presence of an aqueous medium and at a pressure which is at least the equilibrium pressure of said medium at the operating temperature, to a temperature in the range of from about 120° C. to about 160° C. and maintaining said temperature until the temperature difference between the center and the outer parts of the sections is less than about 20° C., which is followed by heating to a temperature in the range of from about 160° C. to about 240° C. for not more than 1 hour until the temperature difference between the center and the outer parts of the sections is less than about 20° C. b) a dewatering stage, and c) a curing stage.

DESCRIPTION OF THE PREFERRED EMBODIMENTS

In the first part of the heating stage the sections of wood are heated to a temperature in the range of from about 120° C. to about 160° C., preferably in the range of from about 130° C. to about 145° C., and the temperature difference between the center and outer parts of the sections is less than about 20° C., preferably not more than about 10° C. and more preferably there is substantially no difference in temperature. In the context of the present invention the term "center of a section" refers to that part of a section which has the greatest distance to the outer sides of said section.

In the first part of the heating stage the sections may be suitably kept at temperature in the specified range for a period between about 0.1 and about 4 hours in order to reach the hereinbefore specified temperature equilibrium between the center and outer parts of a section. As the equilibration of said two temperatures proceeds via heat transfer from the outer parts, i.e. those parts which are in contact with the heat source, to its center, it will be appreciated that the time required to accomplish said temperature equilibrium, will be largely determined by the distance to the center of a section. For regularly shaped sections, e.g. those having rectangular or circular cross-section, said distance will correspond with 50% of the thickness of said section or 50% of the diameter, respectively. In general said temperature equilibrium will be obtained well within said four hours. Advantageously the second part of the softening stage will be started as soon as the required temperature equilibrium has been obtained.

Upon completion of the first heating step, the sections, as mentioned hereinbefore, are heated to a temperature in the range of from about 160° C. to about 240° C., preferably to a temperature from about 170° C. to about 220° C. and more preferably to a temperature in the range of from about 180° C. to about 200° C. Also in this second heating step the applied temperature is maintained until the center of the sections have reached a temperature which is less than about 20° C. lower than that of the outer parts, and preferably less than about 10° C. lower, more preferably there is substantially no temperature difference between the outside and center of a section. The time required to achieve this temperature equilibrium is suitably in the range of from about 0.1 to about 0.75 hour.

As mentioned hereinbefore the softening of the lignocellulosic sections is conducted in the presence of an aqueous medium. The nature of said aqueous medium may vary according to the source of said lignocellulosic sections. When the sections comprise freshly harvested material the moisture content thereof will generally be sufficient to act as aqueous medium. Should however, the moisture content of the starting sections of wood have dropped to a value below that of the corresponding natural material, e.g. as a result of natural or artificial processes, additional aqueous medium will have to be supplied before commencing the softening stage. Conveniently said additional aqueous medium comprises water. Preferably the sections of wood are contacted with the aqueous medium before the actual softening stage commences. More preferably said material is soaked in said aqueous medium, at ambient or elevated temperature, for it to acquire a sufficient moisture content. Suitably the sections which are employed in the softening stage, have a moisture content in the range of from about 50% to about 60% by weight.

In view of the aqueous nature of the medium, in the presence of which the softening stage is to be conducted, steam is a preferred source of heat for use in said stage of the process of the present invention. The actual heating of the sections being preferably accomplished by said steam condensing on the surface of the sections.

It is preferred to effect the softening of the sections at a pressure which is higher than the equilibrium vapor pressure of the aqueous medium at the operating temperature.

Without wishing to be bound by any theory, it is believed that the high level of mechanical performance properties which can be obtained with these lignocellulosic materials resulting from the process of the present invention, are related to the heating profile which is applied in the softening stage. In the first part of the softening stage, i.e. at a temperature in the range of from about 120° C. to about 160° C., the degree of hydrolysis of the hemicellulose and the disproportionation of the lignin is virtually negligible. Only during the second part of the softening stage, i.e. at a temperature in the range of about 160° C. to about 240° C., will be an appreciable degree of reaction occur. As the temperature at the outside as well as in the center of a section is already high when starting the second part of the softening stage, the time required to provide the sections with the ultimate desired temperature equilibrium, can be relatively short, even though sections of considerably large dimensions may have been used. Hence the chance of the formation of acetic acid, in addition to that of sugars and aldehydes during the hydrolysis of the hemicellulose, is relatively small and/or kept within acceptable limits. In this context it should be mentioned that the presence of acetic acid may not only catalyze the hemicellulose hydrolysis, but may simultaneously also result in a partial decomposition of the cellulose fiber structure, which phenomenon may in turn be reflected in the poor mechanical performance properties of the ultimate composite.

In summary it can be concluded that the application of the heating profile in the softening stage of the present invention reduces the overall residence time at a high temperature of the lignocellulosic sections, thereby preventing the formation of unacceptable amounts of the harmful acetic acid.

The sections of wood which may be used as starting material in the process of the present invention will generally comprise sections of lightwood, i.e. materials characterized by a low density, relatively poor mechanical performance properties and poor moisture resistance. The use of said lightwood material in the present process will result in composites which show a significant improvement in the mechanical properties and moisture resistance compared to that of the starting materials. Examples of trees yielding such lightwood starting materials, include but are not limited to spruce, poplar, willow, beech pine and eucalyptus, i.e. trees which in general have a high growth rate.

Sections of heavywood may suitably also be used in the process of the present invention, however, with these materials the most important improvement will be found in the moisture resistance of the ultimate composite.

The size and shape of the sections of wood to be used in the present process are not critical. Advantageously the present process can be used for sections having a smallest dimension which is considerably larger than of those materials used in the process of the prior art, and wherein the use of such sections would have resulted in composites having poor mechanical performance properties. There is however a maximum for said smallest dimension, which maximum is determined by the time wherein said temperature equilibrium in the second part of the softening stage should be achieved, i.e. a period of not more than one hour.

It will be appreciated that the actual value for the maximum of the smallest dimension will also be dependent on the nature of the lignocellulosic material to be used, as it can be expected that the heat transfer through a low density lignocellulosic material from surface to center will require less time than would be the case for a section of similar dimensions having a higher density. Hence the smallest dimension of a lightwood section for use in the present process may be considerably larger than for one based on heavywood.

As the present process is eminently suited to be conducted on a larger scale, it can advantageously be used for industrial purposes. Hence it will be appreciated that a constant quality of the ultimate composite will be a primary requirement. Consequently it is preferred in the present process to employ not only sections based on the same type and source of lignocellulosic material but moreover also having the same shape and size.

Upon completion of the softening stage the reactor contents are cooled to a temperature below about 100° C. before the reactor is opened. Subsequently the softened material is submitted to a dewatering treatment to remove most of the aqueous medium, if not all. Dewatering may be effected, for example, by the application of pressure to the material by means of rollers and/or a press, by vacuum evaporative drying techniques or via chemical means, e.g. by contacting with a suitable adsorbent or absorbent. In such a dewatering stage it is preferred that the temperature should not exceed about 100° C. and preferably no exceed about 80° C., in order to prevent premature cure or crosslinking occurring in the softened material. More preferably the dewatering stage is conducted after having cooled the softened material to a temperature below about 10° C. Under these conditions the reactive compounds formed during the hydrolysis of the hemicellulose and/or disproportionation of the lignin have a low solubility or are insoluble in the aqueous medium. This will thus reduce the loss of said reactive compounds during the dewatering stages and which play a vital part in the subsequent curing stage.

It is a particularly advantageous feature of this invention that the product of the softening stage and the dewatering stage is a soft material capable of being easily molded. Accordingly, a most convenient method of effecting the process of the invention is to cure the material being processed in a heated mold. This enables the aggregate product to be formed in any desired shape. Sufficient pressure is applied during curing in the mold to achieve a product of the required density and shape, such pressures typically ranging from about 1 bar to about 50 bar, often pressures in the range of from about 3 bar to about 20 bar being sufficient for most purposes. Curing is effected at a temperature in the range of from about 100° C. to about 220° C., typically from about 14° C. to about 200° C.

The duration of the curing stage will vary according to the material being cured and the prevailing temperature. Complete curing will require a residence time of from about 10 minutes to, in some cases, up to about 10 hours. In most cases a cure time in the range of from about 1 hour to about 3 hours will be sufficient to obtain a high-quality wood material.

Any aqueous medium present in the softened lignocellulosic material after the dewatering stage will almost certainly be removed via evaporation during the subsequent curing stage.

In the context of the present invention the term "mold", wherein the dewatered softened wood is to be cured, should be interpreted to also include a platen press equipped with spacers and further auxiliary equipment, wherein regularly shaped, softened sections are placed next to one another for curing. Should the dimensions of the ultimate desired composite be such that it can't be directly obtained from a single softened section, then this can be remedied by employing a mold having the required dimension and introducing therein a sufficient number of softened sections and cure them together to provide the desired composite.

Whenever possible it is advantageous to conduct one or more and preferably each stage in the absence or substantial absence of oxygen, especially those stages which are conducted at elevated temperature. It has been found that the presence of oxygen can have a negative influence on one or more of the properties of the ultimate composite. An obvious way to achieve an oxygen-free environment is to avoid the introduction of air together with the sections of wood to be softened. This may conveniently be achieved by immersing the starting material in water, preferably at elevated temperature, especially up to about 100° C., before treatment. This has the dual effect of expelling any air trapped in the starting material and ensuring the material has the required moisture content for the softening stage, as discussed hereinbefore.

In addition to having considerably improved mechanical properties and moisture resistance, the sections of high-quality wood prepared according to the process of the present invention have maintained the typical wood appearance characteristics of the starting material, i.e. the presence of a grain. The presence of said grain in the ultimate composites confirms that the elongate cellulosic structure of the starting material has been maintained, and allows the obtained composites to be worked by the same techniques as untreated wood, e.g. sawing and planing.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be further described by the following example which is provided for illustrative purposes only and is not to be construed as limiting the invention.

EXAMPLE

6 Sections of sawn poplar having the following dimensions: length 2 m, width 12 cm and thickness 5 cm, were soaked overnight in a steam heated bath of 90° C. Subsequently the soaked wooden sections were heated in a closed vessel to a temperature of 140° C., by means of saturated steam of 140° C. until the core temperature of the sections had reached 130° C., which required approximately 1 hour. This was followed by heating the sections to 190° C. by contacting with steam of 190° C. condensing on the surface of the wood. Heating was continued until the core had reached a temperature of 185° C., which was accomplished in 30 minutes. Subsequently the contents of the vessel were cooled to 10° C. before opening the vessel whereupon the softened sections were transferred to a press and compressed for 5 minutes during which the pressure was gradually increased from 1 bar to 3 bar, to stimulate the removal of the aqueous phase.

The dewatered and softened sections were placed next to one another in a platen press, having a temperature of 195° C., of which both plates were provided with a dewatering screen. The outside sections were supported with a piece of untreated light wood having a somewhat higher thickness than the softened sections, to prevent excessive deformation during the subsequent compression. Finally two stainless steel spacers having thickness of 3 cm were placed on the lower plate, which thickness corresponded with the ultimate thickness of the desired composites (planks).

The press was closed for which a pressure of 5 bar was required, and the samples held at 195° C. for 1.5 hours. Subsequently the material was allowed to cool to ambient temperature before being evaluated. The evaluation results have been collected in Table 1, hereinafter.

COMPARATIVE EXPERIMENT

The procedure as described in the Example was repeated with the exception that the sections of poplar were heated to 190° C. in a single step by immediate exposure to steam of 190° C. until the core temperature had reached 185° C. which was accomplished in 1 hour. The evaluation results have been included in Table 1.

TABLE 1

| Properly | Example | Comp. Experiment |
|---|---|---|
| Density, g/cm$^3$ (p) | 0.7 | 0.7 |
| Bending strength, M.Pa (T) | 140 | 40 |
| Specific bending strength, (T/p) | 200 | 57 |
| Elasticity modulus, G.Pa (E) | 30 | 13 |
| Specific elasticity modulus (E/p) | 21 | 9 |

From the data collected in Table 1 it can be observed that the mechanical properties of the composite derived from lightwood section which had been treated according to the process of the present invention are superior to those of the corresponding composite which had been prepared according to a known process. The moisture resistance of both composites was excellent.

What is claimed is:

1. A process for upgrading low-quality wood to high-quality wood comprising: a) a softening stage, wherein one or more sections of low quality wood are heated in the presence of an aqueous medium and at a pressure which is at least the equilibrium pressure of said medium at the operating temperature, to a first temperature in the range of from about 120° C. to about 160° C. and maintaining said temperature until the temperature difference between the center and the outer parts of the sections is less than about 20° C. and then heating to a second temperature in the range of from about 160° C. to about 240° C. for not more than one hour until the temperature difference between the center and the outer parts of the sections is less than about 20° C., b) a dewatering stage, and c) a curing stage.

2. The process of claim 1 wherein the sections are heated to a first temperature in the range of from about 130° C. to about 145° C.

3. The process of claim 2 wherein the second temperature is in the range of from about 170° C. to about 220° C.

4. The process of claim 3 wherein the softening stage is conducted at a pressure which is higher than the equilibrium pressure at the operating temperature.

5. The process of claim 4 wherein the temperature between the center and the outer parts of the sections is not more than about 10° C.

6. The process of claim 4 wherein the second temperature is maintained for a period of time from about 0.1 to about 0.75 hour.

7. The process of claim 6 wherein the heating is effected by means of steam.

8. The process of claim 7 wherein the sections to be treated have a moisture content in the range of from about 50% to about 60% by weight.

9. The process of claim 8 wherein the sections are cooled to a temperature below about 100° C. before being dewatered.

10. The process of claim 8 wherein the sections are cooled to a temperature below about 10° C. before being dewatered.

11. The process of claim 10 wherein the curing is conducted at a temperature in the range of from about 100° C. to about 220° C.

12. The process of claim 11 wherein the sections of wood are of the same type, and have the same shape and size.

13. The process of claim 2 wherein the second temperature is in the range of from about 180° C. to about 200° C.

14. The process of claim 13 wherein the softening stage is conducted at a pressure which is higher than the equilibrium pressure at the operating temperature.

15. The process of claim 14 wherein there is substantially no temperature difference between the center and the outer parts of the sections.

16. The process of claim 15 wherein during the second part of the softening stage the temperature is maintained for a time in the range of from about 0.1 to about 0.75 hour.

17. The process of claim 16 wherein the curing is conducted at a temperature in the range of from about 140° C. to about 200° C.

18. The process of claim 17 wherein the sections to be treated have a moisture content in the range of from about 50% to about 60% by weight.

19. The process of claim 18 wherein the sections of wood are of the same type, and have the same shape and size.

* * * * *